United States Patent [19]
Doo et al.

[11] Patent Number: 5,926,819
[45] Date of Patent: Jul. 20, 1999

[54] IN-LINE TRIGGERS

[75] Inventors: Lip Boon Doo, San Jose; Sandeep Jain, Belmont; Mark Ramacher, San Mateo, all of Calif.

[73] Assignee: Oracle Corporation, Redwood Shores, Calif.

[21] Appl. No.: 08/866,823

[22] Filed: May 30, 1997

[51] Int. Cl.[6] .................................................. G06F 17/30
[52] U.S. Cl. .............................. 707/104; 707/2; 707/100; 707/102; 707/103
[58] Field of Search .............................. 707/2, 100, 102, 707/103, 104

[56] References Cited

U.S. PATENT DOCUMENTS

| | | | |
|---|---|---|---|
| 5,564,047 | 10/1996 | Bloem et al. ........................... | 707/100 |
| 5,680,602 | 10/1997 | Bloem et al. ........................... | 707/1 |
| 5,680,614 | 10/1997 | Bakuya et al. ......................... | 707/103 |
| 5,682,535 | 10/1997 | Knudsen ................................. | 395/701 |

*Primary Examiner*—Paul R. Lintz
*Attorney, Agent, or Firm*—McDermott, Will & Emery

[57] ABSTRACT

An in-line trigger is a modular, compiled, template trigger, which defines a series of actions to be performed when an operation is applied to a body of data. The series of actions to be performed when an in-line trigger fires are compiled into machine language instructions that receive three kinds of parameters: trigger-type specific parameters, operational metadata, and operational data. Trigger-type specific parameters are loaded into a section of run-time memory once for multiple firings of the same trigger. Operational metadata and operational data are loaded each time the trigger fires.

30 Claims, 4 Drawing Sheets

IN-LINE TRIGGERS

FIELD OF THE INVENTION

The present invention relates to database systems and more particularly to techniques for automatically performing a series of actions when an operation is applied to a body of data.

BACKGROUND OF THE INVENTION

In a database system, a trigger is an object that specifies a series of actions to be automatically performed when a specific event occurs. According to industry standards, events that cause triggers to be activated (or "fired") are DML (Data Manipulation Language) statements. Thus, triggers may be designed to fire when a row of a database table is updated, inserted, or deleted. Accordingly, an individual trigger is typically associated with one database table.

The series of actions specified by a trigger is typically written as instructions in a high-level database language such as SQL and PL/SQL, an extension of SQL available from Oracle Corp. of Redwood Shores, Calif. In conformance with industry standards, these instructions must be able to access the data values of table columns corresponding to an affected row before the triggering DML statement was applied (the "old values") and after the modification was applied (the "new values").

Since triggers are objects, database customers can define, remove, and store triggers within a database, and the database system keeps track of which triggers have been defined for which table by storing that information as metadata in the data dictionary. Consequently, triggers enable database customers to implement additional functionality in their databases for such purposes as enforcement of business rules and security.

For example, the owner of a financial database may require for an account table that no account can be opened with a negative balance. In this case, a database administrator defines a trigger that fires when a row is inserted into the account table. The actions specified by the definition of the trigger would direct the database system to check the value of the balance column of the account table, and if the balance is negative, generate an error message. After the database administrator has stored the instructions for the trigger in the database, when a user or application creates a new row in the account table, the database system fires the trigger. When the trigger is fired, the database system loads the trigger instructions as indicated in the metadata for the account table and interprets those instructions. In this example, the instructions check the opening account balance and generate an error message when the balance is negative.

Another use for triggers is data replication. Under certain conditions, it is desirable to store copies of a particular body of data, such as a table in a relational database, at multiple sites. If users are allowed to update the body of data at one site, the updates must be propagated to copies at other sites in order for the copies to remain consistent. The process of propagating changes is generally referred to as replication.

Some databases implement replication by defining triggers when DML statements are executed, for example, when a user inserts, modifies, or deletes a row in a table. In response to such a firing event, a replication trigger performs a series of operations that ultimately results in the change being propagating to the replication sites. For example, a replication trigger may submit the modification to a job queue. A replicator process periodically inspects the job queue for replications to perform, and upon finding jobs in the queue, performs those replications. In another example, a replication trigger can propagate changes to another site before the current transaction commits. In either example, the performance of the replication trigger impacts the performance of the user statement which inserted, modified, or deleted the row.

The trigger definitions for replication can be created by the database system itself from parameters supplied by a database administrator. These trigger-type specific parameters define details about the replication, such as what kind of replication is requested, which table is to be replicated, and which columns of the table are to be replicated. Thus, a database administrator only has to submit the particular parameters of a replication through a user interface, and the database system itself generates the requisite trigger definitions from the parameters.

Replication is one environment in which a single operation from a user can cause the same kind of DML statement to be applied and, hence, the same trigger to fire, repeatedly for a large number of rows. In such environments, the disadvantages of conventional trigger implementations are especially evident. In specific, conventional trigger implementations suffer in the areas of performance and memory usage.

Conventionally, trigger instructions are written in a high-level language, which must be interpreted at a substantial performance cost. Accordingly, some database systems provide a way for partially compiling or tokenizing those trigger instructions into "stored procedures." The trigger's processing environment, such as the run-time memory configuration, has to be initialized each time a conventional trigger is fired. For example, replication triggers employ a replication-specific parameter that specifies the site to which the changes are to be propagated. This parameter must be loaded into a configured section of memory each time the trigger is fired, although the parameter has a constant value for that trigger. As an another example, the trigger instructions may need to have access to such DML statement metadata as the name of the table for which the trigger fired.

Some database systems attempt to reduce the performance penalty of trigger parameters by hard-coding them into the trigger instructions as constants and literals. However, this approach results in trigger proliferation. In other words, since parameters are hard-coded, a trigger for each table must use a distinct sequence of instructions. Each trigger consumes much memory. If, for example, there are thousands of replicated tables, then there are thousands of triggers. Accordingly, trigger proliferation consumes much memory. Furthermore, proliferated triggers with hard-coded parameters cannot reuse the same run-time memory configuration, initialized by a similar trigger. Therefore, it is desirable to reduce the memory consumption caused by trigger proliferation.

Another drawback to conventional triggers is that their instructions are stored in the database and are consequently open to intentional or accidental modification by users of the database system. If a user modifies a replication trigger, the database system can no longer guarantee correct performance of the data replication. The modified trigger instructions may contain errors that prevent the replication or even corrupt other data in the database. Thus, there is a need for secure triggers.

SUMMARY OF THE INVENTION

Accordingly, one aspect of the invention is a method for automatically causing a series of actions to be performed when an operation is applied to a body of data. The method includes the step of defining a trigger for firing when the operation is applied to the body of data. This trigger specifies the series of actions and trigger-type specific data.

When the operation is applied to the body of data, the following steps are performed. The method has a step for determining whether there is a section of run-time memory associated with the operation. If there is no such section, then the operation is compiled into a compiled form and the trigger-type specific data is loaded into this run-time section. In either case, the method comprises the step of loading operation metadata that describes the body of data and operational data that describes the effect of applying the operation. The method also includes steps for applying the operation to the body of data and causing the series of actions to be performed based on the trigger-type specific parameters, the operational metadata, and the operational data.

Another aspect of the invention is a computer system comprising one or more modular compiled template triggers and a database kernel process. The database kernel process is configured to invoke one or more of the modular compiled template triggers in response to a database event, such as receiving a request to perform a data manipulation language (DML) operation on a body of data.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for automatically causing a series of actions to be performed when an operation is applied to a body of data are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
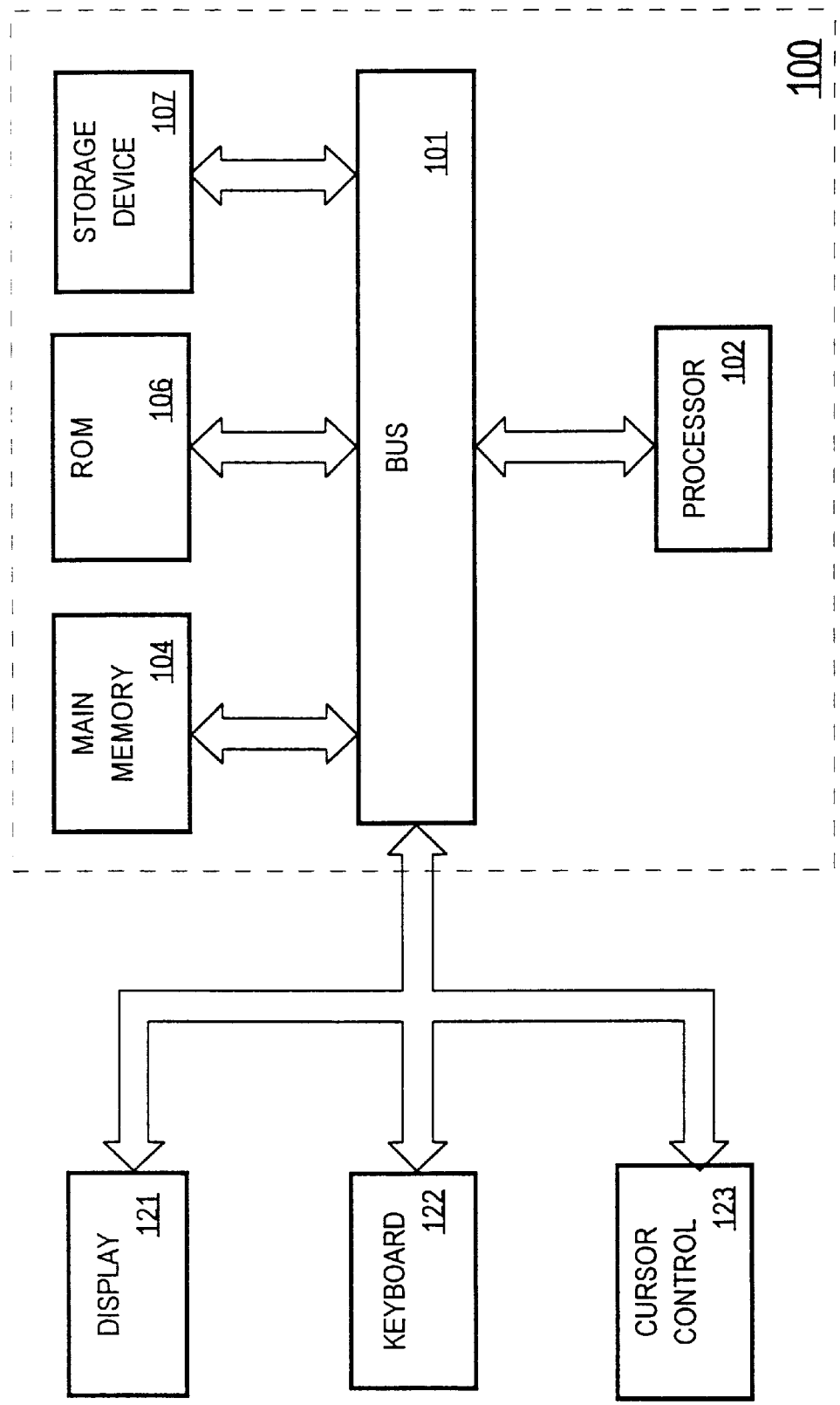
FIG. 1 is a block diagram of a computer system according to an embodiment of the invention.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to automatically cause a series of actions to be performed when an operation is applied. Accordingly, computer system 100 executes sequences of instructions contained in memory 104 in response to processor 102. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

In-line triggers

An in-line trigger is an object that specifies a generic sequence of instructions, preferably linked into the database kernel as compiled code, which automatically executes when a specific event, such as a DML operation, occurs within a database. Unlike conventional triggers, in-line triggers are compiled directly into machine language so that the overhead of interpreting a high-level language, partially compiled code, or tokenized code is avoided. Therefore, in-line triggers have a significant performance improvement over prior types of triggers.

Since in-line triggers rely on generic, compiled functions for performing a series of actions, their operating parameters are not hard-coded within their sequences of instructions. Instead, these generic, compiled functions receive as arguments the operating parameters of the in-line trigger. Thus, in-line triggers operate as modular "templates" in that they include all of the code that is common to the normal triggers they replace and parameters for receiving values for non-common code. Three kinds of operating parameters may be passed into an in-line trigger function: trigger-type specific parameters, operational metadata, and operational data.

Trigger-type specific parameters are those parameters that are closely related to the purpose for which the trigger was created. For example, the trigger-type specific parameters for a replication trigger specify the destination site of the replication, the unit of replication (which bodies of data are replicated together), and administrative information such as whether replication is temporarily suspended.

Operational metadata is information about the body of data that is being operated upon. For example, operational metadata describes the name of the user initiating the operation, the nature of the operation (insert, delete, remove, select), the name of the table upon which a DML statement is applied, the owner of the table, a timestamp indicating when the operation is taking place, and so forth. Operational metadata is generally of use for most triggers, even for triggers created for quite different purposes. For example, the name of the table is useful for both replication triggers and summary table triggers.

Operational data is information about the result of applying the operation to a body of data. Specifically, operational data includes the old values and the new values. For example, if a user updates a value in a column from 1 to 2, the old value is 1 and the new value is 2.

A crucial aspect to in-line triggers is evident when a single command by a user causes the same DML statement to be applied to a large number of rows of a table. Repeatedly applying the same DML statement to a large number of rows causes the same trigger to fire repeatedly for each row. Accordingly, the trigger-type specific parameters are loaded into fast, run-time memory the first time a DML statement is applied that would fire the trigger. Instead of deallocating the memory for those parameters after the trigger has performed its series of actions, the run-time memory for those parameters is maintained for another application of the DML statement. In order to prevent an excessive amount of run-time memory being allocated for trigger-type specific parameters, the least recently used set of parameters is periodically "aged-out" and deallocated. According to one embodiment, the memory for these parameters comprises part of a "cursor," that is a section of run-time memory that is allocated for each DML statement. Cursors comprise a parse tree of the DML statement and memory bound variables and persist between applications of the same DML statement.

Therefore, in-line triggers are very efficient in performance, because in-line triggers specify parameterized machine language instructions and the trigger-type specific parameters are loaded once for many firings of the same trigger. The database kernel can be informed of the address of the start of the compiled function by a variety of methods. One method, static linking, is to inform the database kernel of the starting address of the function at the time the compiled object files of the kernel are linked to form an executable file. Another method is to inform the database kernel during run-time, such as when the kernel begins running; this is called "dynamic linking." Yet another method is to inform the database kernel by giving the name of a executable file containing the compiled code. When the database kernel process executes this last form of compiled code, it spawns a new process for executing the function. The particular technique employed for firing an in-line trigger depends on the environment of the in-line trigger. Static linking is preferred for triggers performing specific administrative tasks, such as replication. Spawning a new process is good for firing a trigger of unverifiable security, such as a customer-written trigger, since the operating system will provide some isolation between the trigger process and the database server process of the database system.

In-line triggers also enhance database security because they use compiled functions. Consequently, it is very difficult for users to accidentally or intentionally modify the in-line instructions and in the process corrupt the database system.

The following description will illustrate in detail the implementation and operation of in-line triggers in one specific environment, namely replication triggers that fire when DML statements are applied to database tables. However, those in the art will readily recognize that in-line triggers are not limited to this specific environment but are of general applicability.

Creating In-line Triggers

Figure 2:
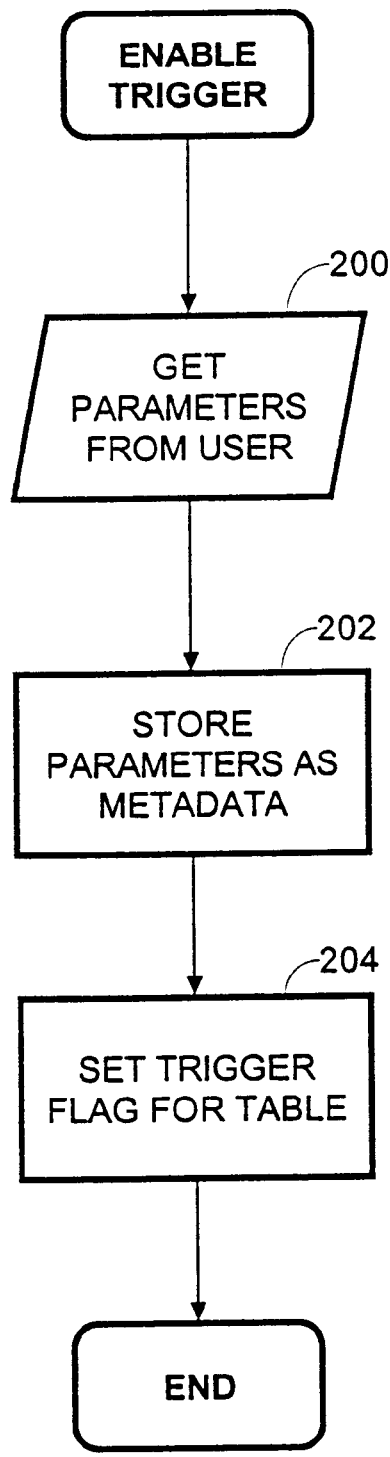
FIG. 2 is a flowchart illustrating the operation of adding an in-line trigger according to one aspect of the invention.

With reference to FIG. 2, when a database administrator enables an in-line trigger for a table, the database system prompts for and receives information through a user interface from the administrator about the specific trigger (step 200). For example, if the trigger is a replication trigger, then the database system prompts for the name of the table being replicated, the kind of the replication, the site to which replicas are propagated and so forth. The specific information requested by the database system will vary from in-line trigger to in-line trigger, depending on the specific purpose the in-line trigger has been coded to perform.

After receiving the information from the administrator, the database system stores that information as metadata in a data dictionary within the database (step 202). Finally, the database system sets a trigger flag, associating that trigger with the table in the data dictionary, to indicate that the in-line trigger is to fire for the table (step 204).

Firing An In-line Trigger

Figure 3:
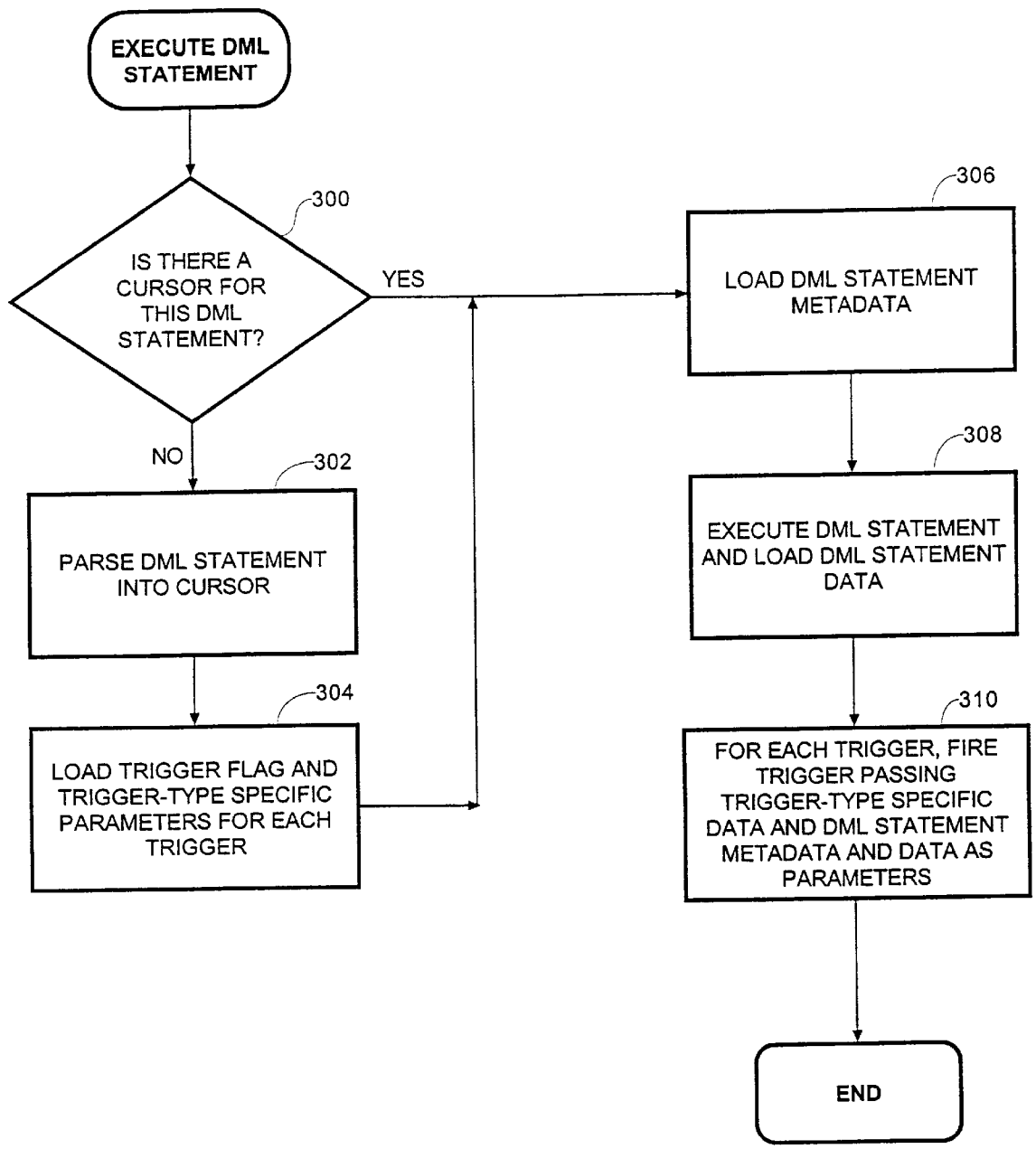
FIG. 3 is a flowchart illustrating the operation of executing an in-line trigger according to an embodiment of the present invention.

When a DML statement is applied to a table for which the database system fires a trigger, the steps depicted in FIG. 3 are executed for in-line triggers during the application of that DML statement. In step 300, the database system checks to see if a cursor has already been instantiated for the DML statement. In one embodiment, DML statements are specified by a string containing an SQL instruction. This string is hashed and used to look up a pointer to a cursor in a hash table. If the pointer is found in the hash table, then the cursor exists. On the other hand, if the pointer is not found, then the cursor does not exist. It is well-known in the art that data structures equivalent to hash tables, such as linked lists, trees, and arrays may be employed as well; however, hash tables are preferred because of their performance during lookup.

If the cursor does not exist for the DML statement, then the DML statement is parsed and compiled to form a cursor (step 302). Thus, the cursor includes a compiled form of the DML statement as well as memory for variables used in the DML statement. The invention does not require any particular way to parse and compile DML statements; indeed, a variety of such ways is known in the art. However, the resulting cursor should include memory or a reference to memory for trigger-type specific parameters.

In step 304, a trigger flag and trigger-type specific parameters are loaded into the cursor, by calling a call-back function associated with that in-line trigger. Ultimately, these parameters come from metadata stored in the data dictionary, but a preferred embodiment stores a copy of this metadata in a "library cache" in main memory to improve the performance of loading this metadata.

After completing the creation of the cursor in steps 302 and 304, or if a cursor was already instantiated for the DML statement, step 306 is performed. At step 306, DML statement metadata is loaded into run-time memory. At step 308, the DML statement is executed and the old values and new values are determined and loaded.

At this point, the database system successively fires each in-line trigger created for the table by calling the compiled function (step 310). In one embodiment, the compiled functions for in-line triggers are statically linked to the database kernel and are therefore always present in the database system. Accordingly, the fact that an in-line trigger is "created" for a particular table is determined by determining whether a trigger flag (consisting of one bit in the metadata for the table) is enabled. The operation of such an embodiment is described in more detail hereafter. In another embodiment, the database system maintains a list of pointers to the in-line trigger compiled functions and the trigger-specific parameter loading call-back functions. When steps 304 and 310 are performed, the database system simply steps through this list executing each trigger-specific parameter loading call-back function and trigger compiled function, respectively. After all the triggers associated with the table have fired, processing the DML statement is complete.

In-line Triggers for Replication

Data replication is one environment in which a database system employs a plurality of in-line triggers. Determining the number and functionality of each in-line trigger depends on a careful consideration of the purpose and parameters for each in-line trigger. First, an overview will be made of the various types of replication that can be implemented with in-line triggers and some of their required parameters. After this overview, the operation of an embodiment of the invention implementing multiple in-line triggers for replication will be discussed.

Replication Parameters for In-line Triggers

Data replication can follow one of two models in propagating changes from one site to another: a "push" model and a "pull" model. In the push model, changes are propagated to the replication sites at the request of the site at which the changes were made. In the push model, data replication can be either synchronous or asynchronous. Synchronous replication maintains multiple copies of the same data and guarantees that each copy of the data is identical within a distributed database system. To ensure this guarantee, the replication is treated as part of a transaction that performs an update. Accordingly, the database system at the site of the modification does not consider the transaction complete until all of the replicas are updated by a two-phase commit.

According to one embodiment, an in-line trigger for performing synchronous push replication requires replication-specific parameters such as the unit of replication, the number and identity of the replicated columns, and a list of the sites containing the replicas. In addition, the replication-specific parameters include such administrative information as whether replication is turned off or temporarily suspended. The non-replication-specific information required by this in-line trigger includes transaction identifiers, the name of the user, the name and owner of the modified table, the names of the columns, their old values, their new values, and their types.

Asynchronous replication, on the other hand, updates the replicas without respect to when the transaction performing the updates is completed, allowing the user to continue working with the local database sooner. An asynchronous trigger places the modification in a deferred transaction queue, which is periodically inspected by a dequeue process for pushing the modification to the replication sites.

According to one embodiment an in-line asynchronous push replication trigger requires such replication-specific parameters as the unit of replication and the number and identity of the replicated columns. Asynchronous push replication requires fewer parameters than the synchronous version, because the dequeue process handles much of the replication functionality. In addition, the replication-specific parameters include such administrative information as whether replication is turned off or temporarily suspended. The non-replication-specific information required by this in-line trigger includes transaction identifiers, the name of the user, the name and owner of the modified table, the names of the columns, their old values, their new values, and their types.

Since both forms of push replication require much the same parameters, a preferred embodiment of the invention combines the instructions for the two in-line triggers into a generic in-line push trigger. Accordingly, that in-line trigger is passed parameters required by both types and an additional parameter that indicates whether asynchronous replication is requested. In addition, since push replication may be turned off or suspended, a preferred embodiment loads the administrative information whether push replication is active for the site before loading the remainder of the parameters for the trigger. In this situation, the preferred embodiment avoids an unnecessary firing of a trigger.

In the pull model, changes are propagated to a replication site at the request of the database system of the replication site. One implementation of the pull model is a snapshot of a master table. A snapshot is a consistent view of the master table, which may be refreshed to provide another consistent view. Changes to a master table are stored in a snapshot log until a snapshot using that table requests a refresh operation. In response to the refresh operation, entries stored in the snapshot log are propagated to the snapshot. The in-line trigger that stores such entries in the snapshot is called herein an "in-line master pull trigger."

According to one embodiment, an in-line master pull trigger requires such replication-specific parameters as the name of the snapshot log, the number and identity of the columns being replicated, and how rows in the master table are identified. The non-specific-replication parameters for the in-line trigger include the old column values, the new column values, the type of the change, and an identifier of the modified row.

According to another embodiment, a snapshot can be updatable so that changes to the updatable snapshot are stored in an updatable snapshot log and propagated back to the master table at refresh time. In this case, an "in-line snapshot pull trigger" stores those changes in the updatable snapshot log. This in-line trigger requires such replication-specific parameters as the name of the updatable snapshot log, the number and identity of the columns being replicated, and how rows in the master table are identified. The non-specific-replication parameters for the in-line trigger include the old column values, the new column values, the type of the change, and an identifier of the modified row.

Multiple In-line Triggers

For some databases, various replication schemes are supported simultaneously. Accordingly, an embodiment for such databases employs multiple in-line triggers. Each specific in-line trigger has a specific trigger flag, which is examined by the database system in sequence.

Figure 4:
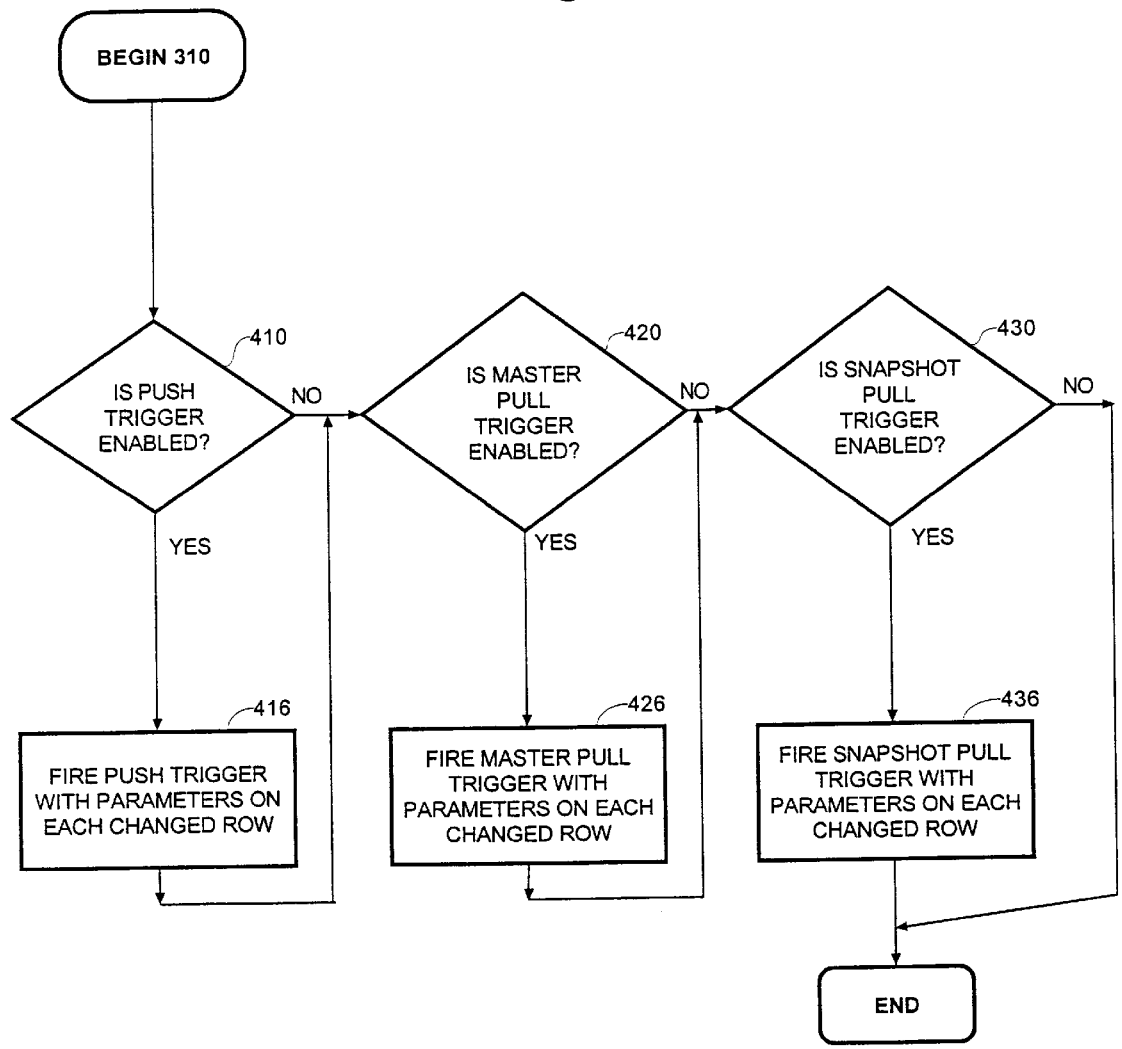
FIG. 4 is a flowchart illustrating the operation of executing an in-line trigger according to another embodiment of the present invention.

Referring to FIG. 4, the operation of firing multiple in-line triggers for replication triggers is illustrated. It is assume that before performing step 310, which comprises steps 410 to 436, step 304 was performed at some point in the past, either during the application of the current DML statement or a prior DML statement. Step 304 ensures that the trigger flag and other trigger-type specific parameters are loaded into run-time memory, preferably as designated bits of a single machine word.

Thus, before step 410 is performed, a plurality of trigger enable flags has been loaded. The bit designated as the in-line push trigger flag is examined (step 410). If the push trigger flag is not enabled, execution skips to step 420.

On the other hand, if the push trigger enable flag is indeed enabled, then the database system calls the compiled code for the in-line push trigger with the trigger-type specific parameters, the operation metadata, and the operational data on each row (step 416), and execution proceeds to step 420.

At step 420, the bit designated as the master pull trigger flag is examined. If the master trigger flag is not enabled, execution skips to step 430. On the other hand, if the master pull trigger flag is indeed enabled, then the database system calls the compiled code for the in-line master pull trigger with the trigger-type specific parameters, the operation metadata, and the operational data on each row (step 426), and execution proceeds to step 430.

At step 430, the bit designated as the snapshot pull trigger flag is examined. If the snapshot pull trigger flag is not enabled, execution returns control to the database system. On the other hand, if the snapshot pull trigger flag is indeed enabled, then the database system calls the compiled code for the in-line snapshot pull trigger with the trigger-type specific parameters, the operation metadata, and the operational data on each row (step 436). Afterwards, execution returns back to the database system.

By providing a plurality of in-line trigger flags for a plurality of in-line triggers, a database system can support a variety of data replication protocols without having the drawbacks associated with the proliferation of conventional triggers. In specific, the memory requirement of in-line triggers is much less than that of conventional triggers, because only one copy of a trigger is stored at each site per replication protocol, rather than per replicated object and protocol. Since in-line triggers are table-independent, they can be written in advance in a compiled programming language like C for high-performance execution. Furthermore, compiled in-line triggers can be stored inside the database kernel and are hence more secure than conventional triggers stored as an object in the database.

In-line Summary Table Triggers

While the present invention of in-line triggers has been described with respect to a replication environment, the present invention may apply to other environments. For instance, the present invention also applies to summary tables. A summary table indexes key values that are based on values contained in one or columns of a base table. For example, a base table has a column with extensive textual data, such as a document. A summary table based on that base table may contain a list of which keywords are found in the textual data of which rows.

To illustrate, suppose the base table has a column for American historical document. Row 1 contains the Declaration of Independence, row 2 contains the federal Constitution, and row 3 contains the Gettysburg Address. A summary table based on this base table would contain an entry that states that the key value "president" is found in row 2 and another entry that states that the key value "liberty" is found in row 1, 2, and 3. In this example, the key values are derived from the column values by extracting substrings; however, summary table key values may be based on a mathematical relationship applied to a column value or to the values of several columns.

When a user modifies a base table, the summary table may, then, become out of date with respect to the base table. Accordingly, one way to bring summary tables up to date would be to inform a process that is responsible for maintaining, updating, or creating the summary table about the modification. In-line triggers, since they are fired upon a modification of table data, are used to queue information about changed base tables so that summary tables may be eventually brought up-to-date.

In the foregoing specification, the invention has been described with reference to specific embodiments thereof It will be evident, however, that various modifications and changes may be made thereto without departing from the broader spirit and scope of the invention. The specification and drawings are, accordingly, to be regarded in an illustrative rather than a restrictive sense.

What is claimed is:

1. A method for applying an operation to a body of data, said method comprising the computer-implemented steps of:
   determining whether there is a section of run-time memory associated with said operation, wherein said section of run-time memory comprises a compiled form of said operation and trigger-type specific parameters loaded from trigger-type specific data specified by a trigger defined for firing when said operation is applied to said body of data to cause a series of actions to be performed;
   if there is not a section of run-time memory associated with said operation, then performing the steps of:
      compiling said operation into said compiled form, and loading said trigger-type specific data as said trigger-type specific parameters;
   loading operational metadata that describes said body of data;
   applying said operation to said body of data;
   loading operational data that describes the effect of applying said operation;
   causing said series of actions to be performed based on said trigger-type specific parameters, said operational metadata and said operational data.

2. The method of claim 1, wherein the step of causing a series of actions to be performed includes the step of causing said operation to be asynchronously replicated at a copy of said body of data.

3. The method of claim 1, wherein the step of causing a series of actions to be performed includes the step of causing said operation to be synchronously replicated at a second copy of said body of data.

4. The method of claim 1, wherein the step of causing a series of actions to be performed includes the step of causing said operation to be asynchronously replicated at a first copy of said body of data and synchronously replicated at a second copy of said body of data.

5. The method of claim 1, wherein the step of causing a series of actions to be performed includes the step of causing said operation to be reflected in a summary table.

6. The method of claim 1, further comprising the step of defining the trigger for firing when said operation is applied to the said of data, wherein the trigger specifies the series of actions and the trigger-type specific data.

7. The method of claim 6, wherein the step of defining the trigger for firing when said operation is applied to said body of data includes the step of defining the trigger for firing when a DML statement is applied to a row of a table.

8. The method of claim 6, wherein the step of defining the trigger for firing when said operation is applied to said body of data includes the steps of:
receiving said trigger-type specific data as input from a user; and
storing said trigger-type specific data as metadata associated with said trigger.

9. The method of claim 6, wherein:
the step of defining the trigger includes the step of storing a first reference to first instructions for causing said series of actions to be performed; and
the step of causing said series of actions to be performed based on said trigger-type specific parameters, said operational metadata, and said operational data includes the step of executing said first instructions based on said first reference with said trigger-type specific parameters, said operational metadata, and said operational data passed as parameters.

10. The method of claim 9, wherein:
the step of defining a trigger for firing when said operation is applied to said body of data includes the step of storing a second reference to second instructions for loading trigger-type specific data into run-time memory; and
the step of loading trigger-type specific data as said trigger-type specific parameters includes the step of executing said second instructions based on said second reference.

11. The method of claim 9, wherein
the step of storing a first reference to first instructions includes the step of statically linking said first instructions to a database kernel.

12. The method of claim 9, wherein
the step of storing a first reference to first instructions includes the step of dynamically linking said first instructions to a database kernel.

13. The method of claim 9, wherein
the step of storing a first reference to first instructions includes the step of storing the name of a first executable file comprising said first instructions.

14. A computer system, comprising:
one or more modular compiled triggers;
a memory for storing trigger flags associated with a body of data for enabling one or more respective triggers from among the one or more modular compiled triggers: and
a database kernel configured to conditionally invoke, based on the trigger flags, said one or more respective triggers in response to a database event for the body of data.

15. The computer system of claim 14, wherein said database kernel is configured to invoke said one or more modular compiled triggers in response to receiving a request to perform a data manipulation language (DML) operation on the body of data.

16. The computer system of claim 15, further comprising:
a section of run-time memory for storing trigger-type specific parameters; and
means for passing said trigger-type specific parameters to a modular compiled trigger associated with said DML operation when invoking said modular compiled trigger.

17. The computer system of claim 16, wherein said one or more modular compiled triggers include a plurality of modular compiled replication triggers, wherein the modular compiled replication triggers, when invoked, cause a change made to a first copy of the body of data to be propagated to a second copy of the body of data.

18. A computer readable medium having stored thereon sequences of instructions for applying an operation to a body of data, said sequences of instructions including sequences of instructions for performing the steps of:
determining whether there is a section of run-time memory associated with said operation, wherein said section of run-time memory comprises a compiled form of said operation and trigger-type specific parameters loaded from trigger-type specific data specified by a trigger defined for firing when said operation is applied to said body of data to cause a series of actions to be performed;
if there is not a section of run-time memory associated with said operation, then performing the steps of:
compiling said operation into said compiled form, and
loading said trigger-type specific data as said trigger-type specific parameters;
loading operational metadata that describes said body of data;
applying said operation to said body of data;
loading operational data that describes the effect of applying said operation;
causing said series of actions to be performed based on said trigger-type specific parameters, said operational metadata and said operational data.

19. The computer readable medium of claim 18, wherein causing a series of actions to be performed includes the step of causing said operation to be asynchronously replicated at a copy of said body of data.

20. The computer readable medium of claim 18, wherein the step of causing a series of actions to be performed includes the step of causing said operation to be synchronously replicated at a second copy of said body of data.

21. The computer readable medium of claim 18, wherein the step of causing a series of actions to be performed includes the step of causing said operation to be asynchronously replicated at a first copy of said body of data and synchronously replicated at a second copy of said body of data.

22. The computer readable medium of claim 21, wherein the step of causing a series of actions to be performed includes the step of causing said operation to be reflected in a summary table.

23. The computer readable medium of claim 18, wherein said sequences of instructions further comprise sequences of instructions for performing the step of defining the trigger for firing when said operation is applied to the said of data, wherein the trigger specifies the series of actions and the trigger-type specific data.

24. The computer readable medium of claim 23, wherein:
the step of defining the trigger includes the step of storing a first reference to first instructions for causing said series of actions to be performed; and
the step of causing said series of actions to be performed based on said trigger-type specific parameters, said operational metadata, and said operational data includes the step of executing said first instructions based on said first reference with said trigger-type specific parameters, said operational metadata, and said operational data passed as parameters.

25. The computer readable medium of claim 23, wherein the step defining the trigger for firing when said operation is applied to said body of data includes the step of defining the trigger for firing when a DML statement is applied to a row of a table.

26. The computer readable medium of claim 23, wherein the step of defining the trigger for firing when said operation is applied to said body of data includes the steps of:

receiving said trigger-type specific data as input from a user; and storing said trigger-type specific data as metadata associated with said trigger.

27. The computer readable medium of claim 9, wherein the step of storing a first reference to first instructions includes the step of storing the name of a first executable file comprising said first instructions.

28. The computer readable medium of claim 24, wherein the step of storing a first reference to first instructions includes the step of statically linking said first instructions to a database kernel.

29. The computer readable medium of claim 24, wherein the step of storing a first reference to first instructions includes the step of dynamically linking said first instructions to a database kernel.

30. The computer readable medium of claim 24, wherein:

the step of defining a trigger for firing when said operation is applied to said body of data includes the step of storing a second reference to second instructions for loading trigger-type specific data into run-time memory; and the step of loading trigger-type specific data as said trigger-type specific parameters includes the step of executing said second instructions based on said second reference.

* * * * *